United States Patent
Paquet et al.

(10) Patent No.: US 10,997,184 B2
(45) Date of Patent: May 4, 2021

(54) SYSTEM AND METHOD FOR RANKING SEARCH RESULTS

(71) Applicant: COVEO SOLUTIONS, INC., Québec (CA)

(72) Inventors: Sébastien Paquet, Québec (CA); Michel Lemay, Québec (CA)

(73) Assignee: COVEO SOLUTIONS, INC., Québec (CA)

(*) Notice: Subject to any disclaimer, the term of this patent is extended or adjusted under 35 U.S.C. 154(b) by 641 days.

(21) Appl. No.: 15/576,020

(22) PCT Filed: May 20, 2016

(86) PCT No.: PCT/CA2016/050577
§ 371 (c)(1),
(2) Date: Nov. 21, 2017

(87) PCT Pub. No.: WO2016/187705
PCT Pub. Date: Dec. 1, 2016

(65) Prior Publication Data
US 2018/0150466 A1    May 31, 2018

Related U.S. Application Data

(60) Provisional application No. 62/165,529, filed on May 22, 2015.

(51) Int. Cl.
*G06F 16/00* (2019.01)
*G06F 16/2457* (2019.01)
(Continued)

(52) U.S. Cl.
CPC ...... *G06F 16/24578* (2019.01); *G06F 16/248* (2019.01); *G06F 16/9535* (2019.01)

(58) Field of Classification Search
CPC ................................................ G06F 16/24578
(Continued)

(56) References Cited

U.S. PATENT DOCUMENTS 7,574,426 B1    8/2009  Ortega
7,818,315 B2   10/2010  Cucerzan et al.
(Continued)

OTHER PUBLICATIONS

International Search Report and Written Opinion dated Aug. 11, 2016, in International Application No. PCT/CA2016/050577 (14 pages).

*Primary Examiner* — Alexandria Y Bromell
(74) *Attorney, Agent, or Firm* — Bookoff McAndrews, PLLC

(57) ABSTRACT

A method and system for ranking search results is disclosed. Search sessions are tracked to determined accessed search results. For each accessed search result occurring across the plurality of search sessions, the accessed search result is associated with each search query having been executed within a given search session, prior to the user accessing the accessed search result. A preselection is made among the query elements forming each search query, for indexing the selected query elements. For each pairing of a query element from the preselection and an associated accessed search result, a result score is calculated. A ranking model is then generated. The ranking model contains the result score in association with the corresponding pairing, for ranking subsequent search results from subsequent search queries according to the result scores.

38 Claims, 4 Drawing Sheets

(51) Int. Cl.
    *G06F 16/248* (2019.01)
    *G06F 16/9535* (2019.01)
(58) Field of Classification Search
    USPC .......................................................... 707/723
    See application file for complete search history.

(56) References Cited

U.S. PATENT DOCUMENTS

| | | | |
|---|---|---|---|
| 8,316,019 B1 * | 11/2012 | Ainslie | G06F 16/3322 |
| | | | 707/733 |
| 8,346,799 B1 * | 1/2013 | Huet | G06F 16/951 |
| | | | 707/770 |
| 8,700,544 B2 | 4/2014 | Sontag | |
| 8,874,555 B1 | 10/2014 | Kim et al. | |
| 8,938,463 B1 | 1/2015 | Kim et al. | |
| 8,954,423 B2 | 2/2015 | Chica et al. | |
| 9,015,150 B2 | 4/2015 | Raghavan et al. | |
| 9,064,016 B2 | 6/2015 | Shokouhi et al. | |
| 9,223,868 B2 | 12/2015 | Battle et al. | |
| 2009/0006324 A1 | 1/2009 | Morris et al. | |
| 2010/0306249 A1 * | 12/2010 | Hill | G06Q 50/01 |
| | | | 707/769 |
| 2012/0233176 A1 * | 9/2012 | Korn | G06F 21/6227 |
| | | | 707/747 |
| 2013/0041896 A1 | 2/2013 | Ghani et al. | |
| 2013/0054582 A1 | 2/2013 | Macklem et al. | |
| 2014/0025668 A1 | 1/2014 | Lin et al. | |
| 2014/0122475 A1 | 5/2014 | Li et al. | |
| 2014/0279995 A1 | 9/2014 | Wang et al. | |
| 2014/0289210 A1 | 9/2014 | Taank et al. | |
| 2015/0026153 A1 | 1/2015 | Gupta et al. | |
| 2016/0041982 A1 | 2/2016 | He et al. | |
| 2016/0055252 A1 | 2/2016 | Makeev et al. | |

* cited by examiner

SYSTEM AND METHOD FOR RANKING SEARCH RESULTS

RELATED PATENT APPLICATION

This application is a U.S. national phase entry under 35 U.S.C. § 371 of International Application No. PCT/CA2016/050577, filed May 20, 2016, which claims priority under 35 U.S.C. § 119 to U.S. Provisional Patent Application No. 62/165,529, filed May 22, 2015, the disclosures of which are both incorporated herein by reference in their entireties.

BACKGROUND

Optimizing search results relevancy is highly challenging in an information retrieval system. First, the user's query must be matched with many potential search results, which is complex when queries are too general (i.e. matching too many documents), contain misspelled words or simply use the wrong vocabulary (i.e. words not present in the index). In addition, in order to optimize relevancy, it is not enough to only use the user's query, because it is often not expressive enough to understand what the user needs. Moreover, in most cases, the environment is constantly changing. For example, content is added or modified, new users are introduced to the system or existing user's needs evolve. Thus, results considered relevant at a given moment may not be the most relevant ones, days, weeks or months later. Therefore, the determination of the relevance of search results must evolve over time to reflect such contextual changes.

Hence, there is a need for an improved system which, by virtue of its design and components, would be able to overcome some of the above-discussed prior art concerns.

SUMMARY

An object of the present is to provide a method and system which, by virtue of its design and components, satisfies some of the above-mentioned needs and is thus an improvement over other related ranking systems and/or methods known in the prior art.

In accordance with an aspect, there is provided a method for ranking search results, the method comprising: tracking a plurality of search sessions, each search session comprising one or more search queries made to a search index and one or more accessed search results, each search query defining at least one query element and generating a plurality of search results, and each accessed search result corresponding to one of the generated search results which is accessed by a user during the search session; for each accessed search result occurring across the plurality of search sessions, associating the accessed search result with each search query executed within a given search session, prior to the user accessing the accessed search result; calculating for a preselection of query elements to be indexed, a result score for each pairing of a query element from the preselection and an associated accessed search result; and generating a ranking model containing the result score in association with the corresponding pairing, for ranking subsequent search results from subsequent search queries according to the result scores.

In accordance with another aspect, there is provided non-transitional storage comprising data and instructions for execution by a processor, to carry out the steps of the above-mentioned method.

In accordance with yet another aspect, there is provided a system for ranking search results, the system comprising: a User Interface Module, embedded in a processor, for tracking a plurality of search sessions, each search session comprising one or more search queries made to a search index and one or more accessed search results, each search query defining at least one query element and generating a plurality of search results, and each accessed search result corresponding to one of the generated search results which is accessed by a user during the search session; an Events Database for associating each accessed search result occurring across the plurality of search sessions, with each search query executed within a given search session, prior to the user accessing the accessed search result; an Events Analyser, embedded in the processor, for calculating, for a preselection of query elements to be indexed, a result score for each pairing of a query element from the preselection and an associated accessed search result; and a Query-to-Search-Result Model Database for storing an ranking model containing the result score in association with the corresponding pairing, for ranking subsequent search results from subsequent search queries according to the result scores.

Other objects, advantages and features of the present invention will become more apparent upon reading of the following non-restrictive description of preferred embodiments thereof, given for the purpose of exemplification only, with reference to the accompanying drawings.

DETAILED DESCRIPTION OF PREFERRED EMBODIMENTS

Figure 1:
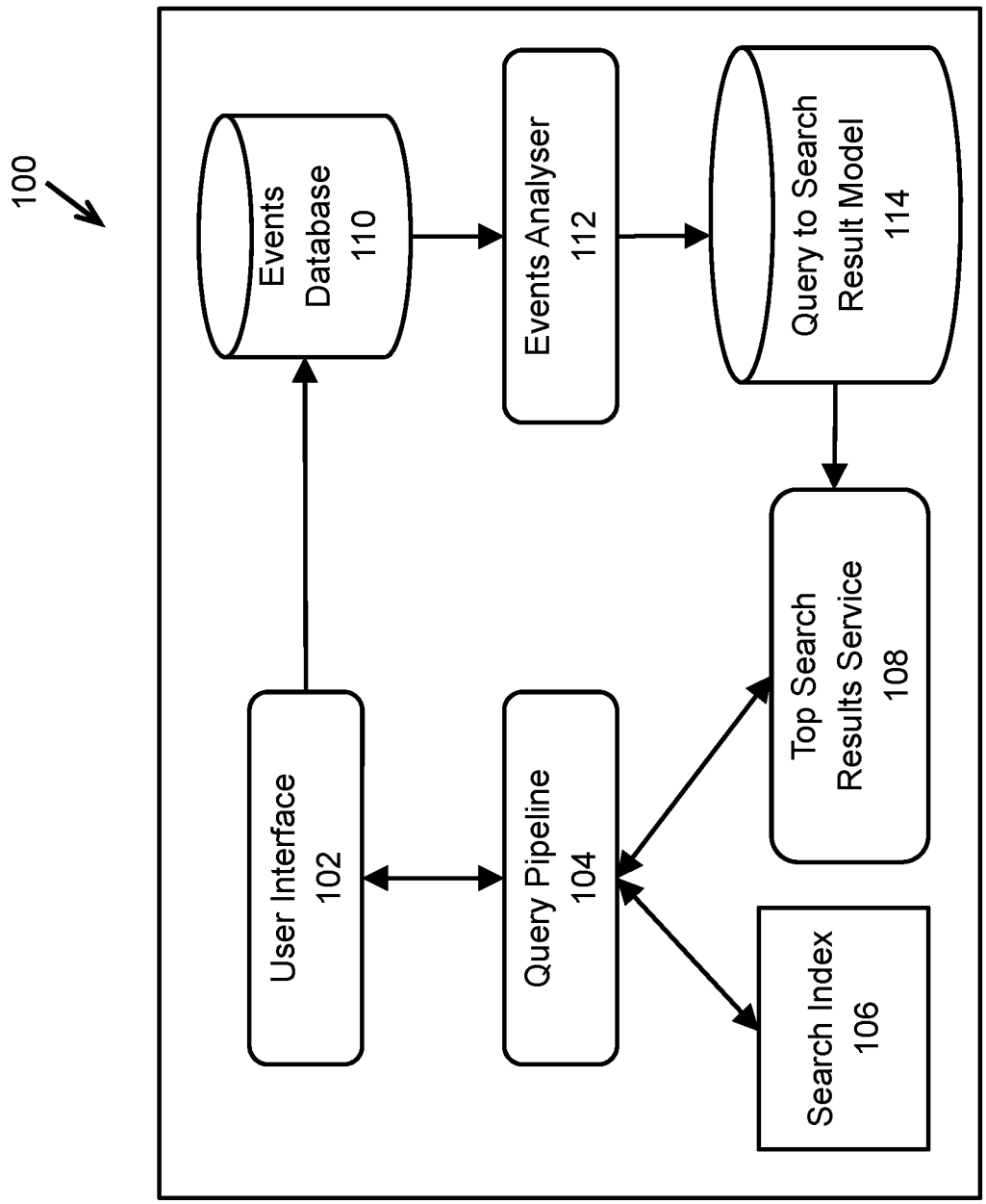
FIG. 1 is a block diagram showing components of a system, according to an embodiment.

In the following description, the same numerical references refer to similar elements. The embodiments mentioned and/or geometrical configurations and dimensions shown in the figures or described in the present description are embodiments of the present invention only, given for exemplification purposes only.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, cellular telephone, smartphone, tablet device, or video game console.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein. In some embodiments, the systems may be embedded within an operating system running on the programmable computer. In other example embodiments, the system may be implemented in hardware, such as within a video card.

Furthermore, the systems, processes and methods of the described embodiments are capable of being distributed in a computer program product comprising a computer readable medium that bears computer-usable instructions for one or more processors. The medium may be provided in various forms including one or more diskettes, compact disks, tapes, chips, wireline transmissions, satellite transmissions, internet transmission or downloadings, magnetic and electronic storage media, digital and analog signals, and the like. The computer-usable instructions may also be in various forms including compiled and non-compiled code.

Broadly described, as exemplified in the accompanying drawings, there is provided a novel system for improving search results relevancy based on the user's interactions with a result ranking system 100. User actions are accounted for implicitly rating of search results, allowing the system to better identify the most relevant search results for a subsequent search query. This allows to shorten the user's search session by predicting the better search results, even if for example, the query is ambiguous or misspelled, by using past users' query rewriting, search results accessed, other interactions, and/or the like. In one embodiment, the system defines positive and negative outcome custom events of a user session, thereby allowing the system to learn to better identify the most relevant search results, in order to avoid negative outcomes and promote positive outcomes. Moreover, the number of steps required by the user to reach the information he/she is looking for is reduced.

An information retrieval system is used by a user to retrieve information being sought after from a collection of content. In a computer-implemented information retrieval system, such as a search engine, a user enters a search query via a user interface and the information retrieval system retrieves search results that are considered relevant to the search query. The search results each link to a piece of content stored in the collection of content. The relevancy may be based on a match of a portion of the search query with content from the collection of content. The content of the collection may be indexed. The search result generated by the information retrieval system may be presented within the user interface and the user may access (ex: by interacting, such as a mouse click) one or more of the search result to further access the content linked to the search result.

It was observed that an individual search query made by a user is not the only piece of information that indicates what content the user is seeking. Multiple search queries made by the user within a short time period may provide additional information as to what content the user is seeking. Similarly, the user's interactions with the information retrieval system, such as accessing of search results, navigation of the information retrieval system and interaction with specific pieces of content may provide further information about what content the user is seeking.

An object of the present is to leverage such user interactions (for example, through positive or negative interpretation of the interactions) in order to improve interpretation of a user's query and to the relevance of the search results presented in response to search queries made by the user.

Referring now to FIG. 1, therein illustrated is a schematic diagram of a result ranking system 100 according to one example embodiment. The system includes a User Interface module 102, a Query Pipeline module 104, a Search Index module 106, a Top Search Results Service module 108, an Events Database 110, an Events Analyzer module 112, and a Query to Search Result Model database 114. It will be understood that the result ranking system 100 may correspond to a fully functional information retrieval system for identifying content relevant to user queries. The User Interface module 102, Query Pipeline module 104, Search Index module 106, Top Search Results Service module 108 and Events Analyzer module 112 may be implemented in a processor of the computing device. The Events Database and Query to Search Result Model database 114 may be implemented in a storage device.

In a model building mode of the result ranking system 100, the user Interface module 102 captures user action events within the result ranking system 100. Such user action events include standard search events (e.g. executing a search query, refining by metadata, accessing a search result) and custom events specific to a particular system (e.g. products added to a shopping cart, support case created, etc.). These user action events are tracked and recorded in the Events Database 104 and are made available to the Events Analyzer module 112, which in turn uses these events to build ranking models which are stored in the Query to Search Result Model database 114. A ranking model provides an indication of search results accessed by a user in a plurality of search sessions, as described elsewhere herein.

In a searching mode of the result ranking system 100, when a subsequent search query is made by a user, the search query is sent via the User Interface module 102 to the Query Pipeline module 104. The Query Pipeline module 104 further calls the Top Search Results Service module 108 with the search query and receives therefrom a pre-ranked list of search results based on the ranking model of the Query to Search Result Model database 114. The Query Pipeline module 104 then uses the pre-ranked list of search results and creates ranking functions for these search results. The Query Pipeline module 104 sends the query with the ranking expressions to the Search Index module 106. In response to receiving the search query, the Search Index module 106 generates a second list of search results. The Search Index module 106 may carry out functions of a typical search engine to identify search results relevant to the search query that are included in the second list of search results. The search results of the second list are combined with the pre-ranked list of search results. The combined list of search results are then returned to the User Interface module 102 and presented to the user. The pre-ranked list of search results from the Query to Search Result Model database 114 influence the search results that are returned to the User Interface module 102 and that are presented as search results in response to the search query. The ranking of the search results from the pre-ranked list and the second list of search results are determined based on the ranking functions for the pre-ranked list. The ranking functions may serve to promote the ranking of results in the pre-ranked list.

It will be understood that the result ranking system 100 may operate simultaneously in the model building mode and the searching mode. For example, as a user is carrying out user action events via the user interface 102 to identify content being sought, the result ranking system 100 is operating in the searching mode in that search queries made by the user generate the combined list of search results from the Search Index module 106 based on existing ranking models stored within the Top Search Results Service module 108. At the result ranking system 100 is also operating in the model building mode in that these user actions events are tracked and recorded in the Events Database 100 and may be used for updating ranking models stored in the Query to Search Result Model database 114.

Continuing with FIG. 1, the User Interface module 102 tracks a plurality of search sessions. A search session includes a plurality of user action events of a user made via the user Interface module 102. The user action events of a search session includes one or more search queries entered into the User Interface module 102 and made to the Search Index module 106. Each search query defines at least one query element and in response to a search query the Search Index module 106 may generate one or more search results. In some cases, the Search Index module 106 may generate zero search results in response to a search query if no relevant search results are found.

The at least one query element defined by a search query corresponds to an element which provides an indication of information being sought by the user making the search query. For example, the search query may include a string of one or more words. A query element of a search query may include the complete search query (i.e. the entire string of one or more words), components of the search query, a derivative of the search query, a component of such a derivative of the query, and/or the like. For example, a query element may be a full query, a stemmed query, a full stemmed query, a word of a query, a tokenized original query, a stemmed word of a query, an original word of a query, and/or any combination thereof.

The search results correspond to content elements from the collection of content elements being searched that has some relevance to at least one query element of the search query as determined by the Search Index module 106. Each search result may link to a content element within the collection of content, such as a file or document (text, image, video, etc.), a webpage, a location on a webpage or other document, which is accessible via a communication network, for example the Internet, a private or local network, and/or the like. A search result may also refer to said hyperlink associated to the content element. In the present, an "accessed search result" (or "clicked search result") refers to a search result having been clicked, selected, viewed, accessed, and/or involving any other interaction by the user, and which represents a level of relevance of the search result to this user. A search result generated from a search query and that has been accessed by a user during a search session is herein referred to as an "accessed search result".

The beginning of the search session may be defined the user beginning a series of user action events via the User Interface module 102. For example, the beginning of the search session may correspond to a user logging into a portal, such as a user portal presented on web browser, desktop application, or mobile application. The end of the search session may be defined by the end of the series of user action events, such as the user logging out, timing out, or closing the portal. Within the search session in which the user accessed one or more search results, the search result that was last accessed by the user prior to the end of the search session is herein referred to as a "last accessed search result".

A user action event may also be a "custom event". A custom event herein refers to a user action event other than a search query or accessing a search result but that is indicative of either a positive outcome or negative outcome regarding the user finding the content being sought. For example, a positive outcome custom event may include a product being added to a shopping cart on an e-commerce site. For example, a negative outcome custom event may include a user creating a support case in a "self-service" website for customer service.

It was observed that where a plurality of search queries are made within a search session, successive search queries made may be representative of refinements of query elements included in the search queries that lead to a search result being sought by the user.

It was also observed that the last accessed search result of a search session may link to the content element being sought by the user.

It was further observed that certain custom events may also be indicative of finding a result being sought or not finding that result.

Although these hypotheses are not always representative of reality in every situation, they are considered to accurately represent the normal behavior of users over a large number of search sessions.

Figure 2:
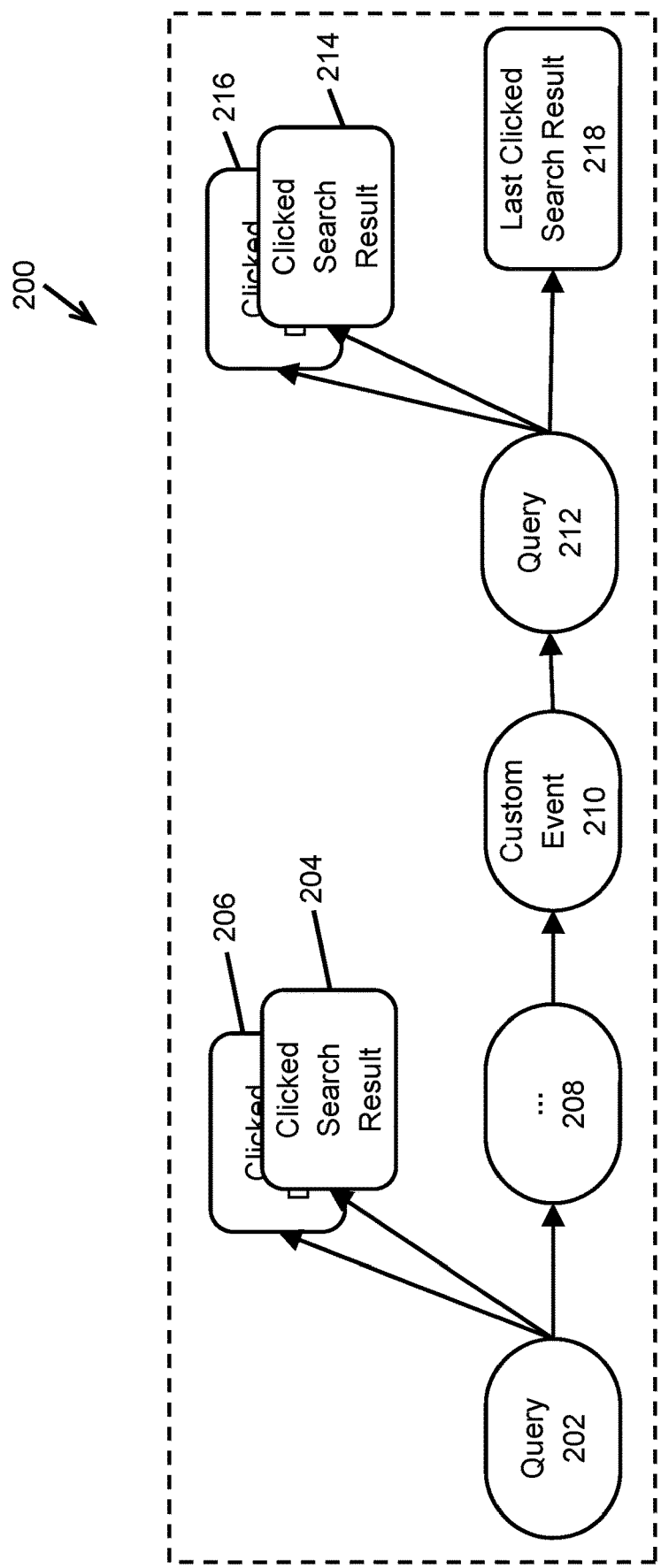
FIG. 2 is a schematic representation of a user session, according to an embodiment.

A search session is represented by all the user action events of a user with the result ranking system 100 through the user interface 102 in that search session. FIG. 2 schematically illustrates a user session 200 according to one example embodiment. During a user session 200, a user may execute multiple search queries 202, 212 and may or may not access search results generated from these search queries 202, 212. In the illustrated example, of the search results generated from the first search query 202, search results 204, 206 were accessed. Break 208 is representative of other user action events made by the user within the search session. A custom event 210 was further made. Furthermore, of the search results generated from the second search query 212, search results 214, 216, and 218 were accessed. The accessed search result 218 was accessed after 214 and 216 and represent the last clicked search result 218. It will be understood that the order of the occurrences of user action events within a search session are tracked. These user action events and their relative order are recorded within the Events Database 110.

Figure 3:
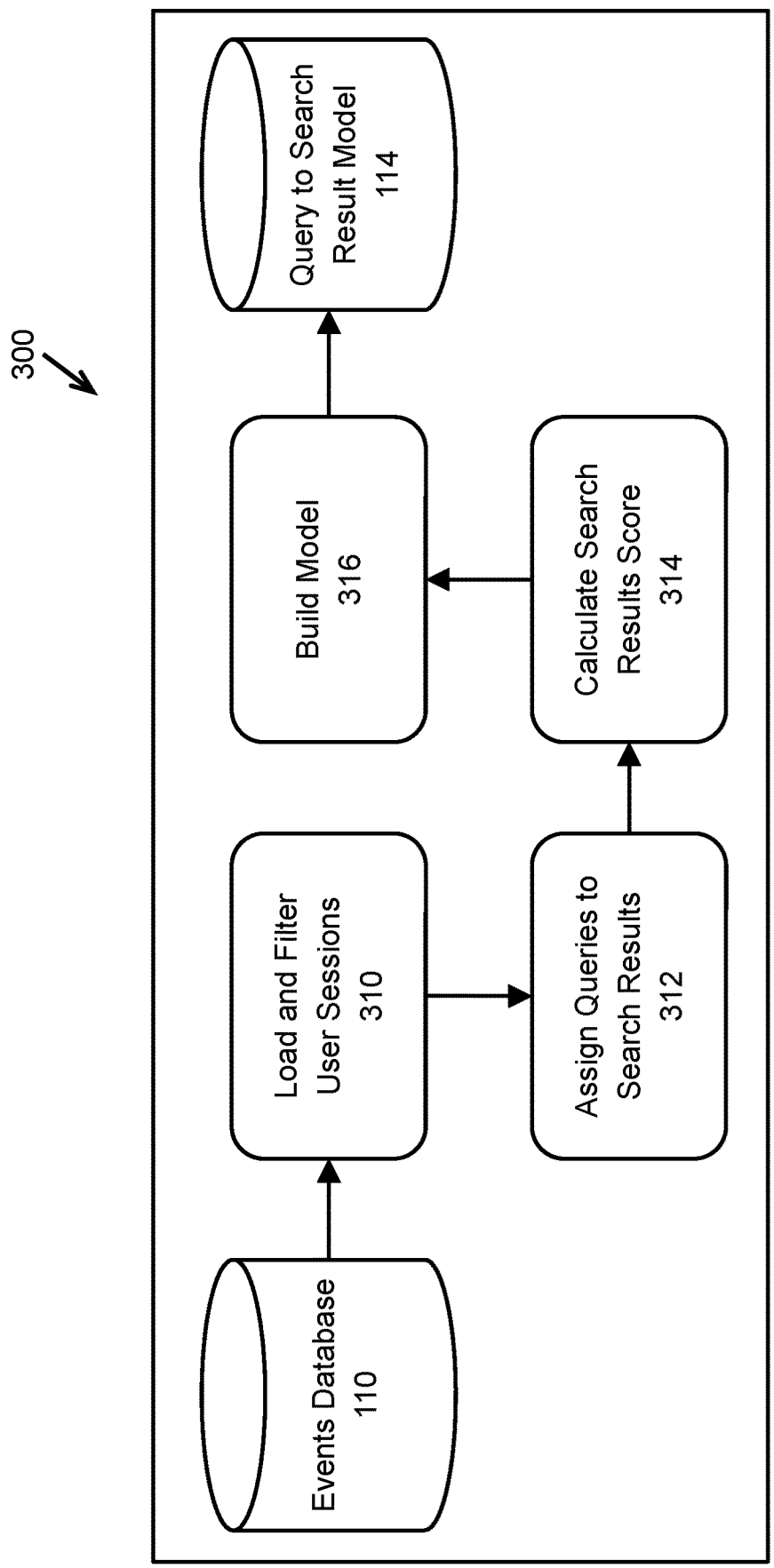
FIG. 3 is a flow chart showing steps of a method of building a ranking model for a search engine, in accordance with an embodiment.

FIG. 3 is a schematic diagram illustrating the operational steps executed by the Events Analyzer module 112 to build the Query to Search Result model 114 (also herein referred to as a "ranking model") from the information in the Events Database 110. The operational steps of the Event Analyzer module 112 may correspond to its submodules. The Query to Search Result model is built based on the aforementioned observation that a user refines his or her queries over the course of a search session to reach the content element being sought.

Continuing with FIG. 3, the Events Analyzer module performs a method 300 of building a ranking model, including at step 310 (a) collecting query elements from multiple search sessions carried out via the search engine, and for each search session, storing each query element in association with an accessed search result of the corresponding search session; at step 312, (b) determining a preselection of query elements to be associated to the accessed search result, representing the most frequent query elements leading to the associated accessed search result; at step 314, (c) calculating a score for each pairing of accessed search result and query element in the preselection of step (b); and at step 316, (d) generating a model containing the calculated score in association with the corresponding pairing, in order to rank the accessed search results according to the score when a given subsequent query is executed.

More particularly, at step 310, search sessions are filtered and loaded. For example, the set of user action events that form together a search session are identified from the user action events recorded in the Events Database 110. A search session may be associated to all search queries, accessed search results and custom events carried out by the user during the search session. The search session is further defined by its duration. A search session begins with the user accessing the user interface module 102 and ends after a period of inactivity or the user logging out. The last accessed search result of each search session may also be identified.

In one example embodiment, sessions comprising at least one negative outcome custom event are filtered out. An example of a negative outcome may involve the system logging a case creation event when the user creates a support case, which shows that the current session was unsuccessful. Other examples of sessions with negative outcomes include sessions without any accessed search results or sessions without at least one non empty query. Search sessions that are filtered out are not taken into account for building the ranking model.

In another embodiment, sessions with at least one negative outcome custom events are not ignored, but search queries and search results of these sessions may be demoted within the ranking model.

In another example embodiment, search sessions with positive outcome custom events are promoted within the ranking model to reinforce the link between the session queries and the accessed search results.

At step 312, search queries are logically associated to search results across a plurality of search sessions. For example, the associating of search queries to search results may be carried out for each of the search sessions to be used for building the ranking model.

More particularly, for each accessed search result occurring across the plurality of search sessions, the accessed search result is associated with each search query executed within the search session of the accessed search result prior to the user accessing the accessed search result. Referring back to FIG. 2, accessed search result 204 is associated to search query 202 that preceded it. Similarly, accessed search result 206 is also associated to search query 202. Accessed search result 218 is associated to both search query 202 and search query 212 since both of these preceded the accessed search result 218 being accessed within the search session 200. Similarly, each of accessed search results 214 and 216 are also associated to search queries 202 and 212.

In one example embodiment, a preselection of query elements to be mapped in the ranking model is determined.

In another example embodiment, the preselection of query elements to be mapped may correspond to all of the query elements of all the query searches across all of the search sessions considered for building the rank model.

The associations of accessed search results to search queries leading up to the accessed search results are further analyzed to determine for each unique query element, the number of accessed search results that is associated to that query element. This count of number of associated accessed search results represents a query frequency score for the query element. That is, for each query element, a frequency score representing the number of times the query element appears in a search query associated to an accessed search result is detected.

In one example embodiment, the query frequency score may be a normalized count, wherein the normalizing is carried out in the range [a,b]=[1/sqrt(N),1] using the following equation:

$$norm(x) = a + \frac{(x - \min) * (b - a)}{(\max - \min)} \quad (1)$$

where N is the search result clicked count, min is the minimum count and max is the maximum count.

For example, those query elements that have a query frequency score exceeding a predetermined threshold may be selected to the preselection of query elements to be mapped. These may correspond to the query elements that most frequently led to a search result being accessed.

In one example embodiment, the types of query element determined from a query search may a tokenized original query, a tokenized and stemmed query, and as a full stemmed query, and a frequency score is determined for each query elements by type. From the frequency scores for each query element, a corresponding set of lists containing query elements may be generated by type. More particularly, four query lists are generated, which correspond to the preselection of query elements to be mapped:
(1) OriginalWordList which contains a selection of tokenized original queries having the highest normalized count (second set).
(2) StemWordList which contains a selection of tokenized and stemmed queries having the highest normalized count (third set).
(3) StemQueryList which contains a selection of full stemmed queries having the highest normalized count (fourth set).
(4) StemWordAllList which contains all tokenized and stemmed queries (a first set).

Continuing with FIG. 3, at step 314, for the preselection of query elements to be indexed, an accessed result score for each pairing of a query element from the preselection and an associated accessed search result is calculated. That is, for each query element of the preselection, a pairing is formed with each accessed search result associated to the query element and a result score is calculated for that pairing.

According to one example embodiment, the result score may be determined based on the query frequency score of the query element of the pairing. It will be appreciated that the query frequency score of the query element indicates the number of times a query element was used that led to a search result being accessed, which provides a metric of the popularity of the query element.

According to one example embodiment, for a subset of the preselection of the query elements, the result score for each pairing of the subset is determined based on the number of search queries associated to the accessed search result of the pairing. The result score is further determined based on the average number of search queries associated to an accessed search result. The number of search queries associated to a given accessed search result indicates the number of search queries made within a search session prior to that search result being accessed by a user. The subset of the preselection may be the query elements in the first set, the second set and the third set.

According to one example embodiment for calculating the result score for a pairing of a given query element with a search result associated to it, an inverse search result frequency (IDF) is calculated for the given query element q, using the following equation:

$$IDF(q) = \ln\left(\frac{nd_t - nd_q + 0.5}{nd_q + 0.5}\right) \quad (2)$$

where $nd_t$ is the total number of accessed search results and $nd_q$ is the number of search results accessed for the query element (i.e. the number of search results that followed any search query that included the query element). Then, the result score (docScore) is calculated for each accessed search results associated to that query element. More particularly, a docScore is calculated for each combination of accessed search result and the associated query element using the following Okapi BM25 equation:

$$docScore(d, q) = \left( \frac{nd_q * (K + 1)}{nd_q + K * \left(1 - B + B * \left(\frac{nq_d}{anq_d}\right)\right)} \right) * IDF(q) \quad (3)$$

where $nd_q$ is the number of search results accessed for the query element, K is a constant with a default value of 1.2, B is a constant with a default value of 0.75, $nq_d$ is the number of search queries that led to the search result and $anq_d$ is the average number of search queries leading to a search result.

According to an alternate embodiment, the score calculation includes a multiplier representing an upgrade or downgrade of the search result (or promotion/boosting and demotion). More particularly, an upgrade multiplier is used when a query and search result pairing happened in a search session with a positive outcome custom. Conversely, a downgrade multiplier is factored in when a query/search result pairing happened in a session with a negative outcome custom event.

Alternatively or additionally, a time decay multiplier is factored into the result score calculation. The time decay multiplier takes into account an "age" of a query/search result pairing, so as to gradually decrease the weight of a particular search result as time lapses.

Alternatively or additionally, an information gain multiplier is factored into the score calculation. The information gain multiplier takes into account how useful a word is when included in a query element to find interesting documents.

At step 314, a ranking model is generated containing the result scores in association with corresponding pairing. The pairings of query elements and associated accessed search results are stored within the ranking model in association with their result score. The ranking model may be used to rank accessed search results associated to query elements stored in the ranking model that match query elements of subsequent search queries made to the Query pipeline module 104. The ranking may be performed according to the result scores. The ranking model may be stored within the Query to Search Result model 114.

According to the example in which four query lists are generated as the preselection of query elements to be mapped, four maps may be generated for the ranking model and stored within the Query to Search Result model. The four maps are:
  (1) stemQueryMap which contains for each stemmed query, the most accessed search results with their search result score (i.e. normalised search result count calculated according to equation 1).
  (2) stemWordAllMap which contains for each stemmed query word, all accessed search results with their search result score as calculated using equation 3.
  (3) originalWordMap which contains for each original query word, the most accessed search results with their search result score as calculated using equation 3.
  (4) stemWordMap which contains for each stemmed query word, the most accessed search results with their search result score as calculated using equation 3.

It will be appreciated that search queries are accumulated during a session and associated with each accessed search result (i.e. "accessed search results"). After multiple sessions are processed, each accessed search result is associated with a list of query elements ranked based on their frequency. The most frequent query elements may be preselected. Then, a search result score is calculated for each pairing of preselected query element and associated search result. The ranking model is composed of a list of query elements, and for each one of them a list of search results and result scores. It will be appreciated that since the ranking model for an accessed search result includes all search queries done within a session before the search result was accessed, the model takes into consideration the manual query rewriting accomplished by users, such as mistyping or misspellings by the user.

The ranking model may be built on a per user basis, wherein one ranking model is built for each user. Accordingly, the Events Analyzer module 112 considers only search sessions made by that user when building a ranking model. The mappings of query elements to associated search results are customized for that user.

Alternatively, the ranking model may be built for a group of users, wherein a single ranking model is built for the group of users. The group of users may be from the same organization or department and may have similar use cases. Accordingly, the Events Analyzer module 112 considers search sessions made all of the users within the group. The mappings of query elements to associated search results are customized for that user group.

The Events Analyzer 112 may periodically update or rebuild the ranking model. For example, after the User Interface module 102 tracks and records newer user action events into the Events Database 110 while the result ranking system 100 operates in the searching mode, the Events Analyzer module 112 may receive search sessions corresponding to the newer user action events and update or rebuild the ranking model based on the newer user action events.

Referring back to FIG. 1, the Query to Search Result Model database 114 is then used by the Top Search Results Service module 108 to return a pre-ranked list of search results from the accessed search results mapped in the model that are associated to query elements that match subsequent search queries made to the Query Pipeline module 104. When a user enters a subsequent query, it is sent to a query pipeline module 104 that is responsible for processing the query pipeline module 104, calling the Search Index module 106 and processing the results before sending them back to the user interface 102. Prior sending the search query to the Search Index module 106, the Query Pipeline module 108 calls the Top Search Results Service with the subsequent search query and receives a pre-ranked list of at least one search result stored in the Query to Search Result Model 114 that best fit the subsequent search query.

Figure 4:
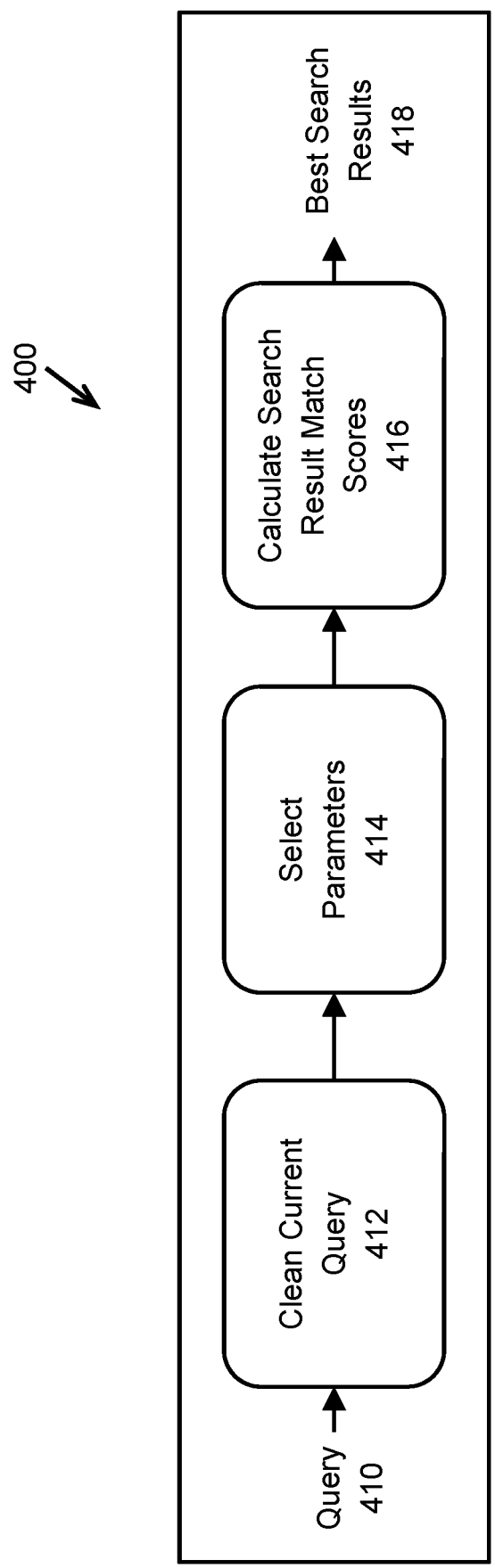
FIG. 4 is a flow chart showing steps of a method of ranking search results, in accordance with an embodiment.

Referring now to FIG. 4, therein illustrated is a method 400 for identifying and ranking accessed search results of the ranking model that match subsequent search queries. The method 400 may be carried out by the Top Search Results Service module 108, the method including (a) providing a ranking model generated from the example methods described above, said ranking model comprising mappings of pairings of query elements with associated search results and result scores; at step 410 (b) receiving a subsequent search query, comprising one or more subsequent query elements; at step 414, (c) determining parameters of the subsequent search queries, such as the length of the subsequent search query; (d) from said ranking model, selecting accessed search results mapped in the ranking model in associated with a query element matching said one or more subsequent query elements of the subsequent search query (i.e. accessed search results stored in the Query to Search Result Model module 114); at step 416, (e) for each selected search result, calculating a ranking score based on the parameters determined at step (c); and (f) ranking the selected search results according to the score for outputting a pre-ranked list of said selected accessed search results at step 418. As a result, at least one accessed search result stored in the ranking is identified based on a match of at least one subsequent query element with a query element stored in the ranking model.

More particularly, at step 412, the subsequent query is cleaned by removing unwanted characters (e.g. punctuations), stemming words and removing stop words.

At step 414, parameters of weighting coefficients are selected. The parameters are used to differently weigh result scores associated to pairings of query elements and associated search results stored in the ranking model. The parameters may be selected based on the length of the query. The different parts of the ranking model have varying importance depending on the length of the query. Therefore, the selection of parameters may be made as a function of the length of the query. Different parameter sets are associated with different query lengths.

In the example embodiment wherein the ranking model comprises the four mappings stemQueryMap, stemWordAllMap, originalWordMap and stemWordMap, each parameter set contains five parameters: four weighting coefficients ($C_{SQM}$, $C_{SWM}$, $C_{SWAM}$, $C_{OWM}$) and one filter component. The coefficients ($C_{SQM}$, $C_{SWM}$, $C_{SWAM}$, $C_{OWM}$) are used to influence how the result scores are combined and the filter component ($F_{SQM}$) is used to choose how many search results will be kept from the stemQueryMap.

The sets of parameters for all query lengths may be learned using the data in the Events database 110 (FIG. 1) based on machine learning applied to the plurality of search sessions for prioritizing the last accessed search results of the plurality of search session. More particular, the sets of parameters are learned according to a parameter optimization process which splits the events in one training set and one test set. First, a model is learned on the training set, as specified previously. Then, different sets of parameters are tested on the test set. The objective is to maximize, for all search sessions in the test set, the percentage of times the last clicked search result of the session is returned in the top 5 results for all queries in the search session. At each iteration, during the parameter optimization process, the parameters tested are carefully chosen using an algorithm that mixes different optimization techniques (i.e. randomized weighted grid search, simulated annealing and genetic algorithms). This algorithm allows to efficiently explore the space of parameter values in order to rapidly estimate the global maximum. A simulated annealing approach is used in which the probability to select a pseudo random point in the parameter space decreases over time. At each iteration, a pseudo random point is selected or one neighbour of an existing point is selected. The pseudo random points are chosen in a way to maximize the distance between tested points. If not in the random condition, an existing point is selected using a weighted random process and one of its neighbours is selected. Possible neighbors are generated using a mutation process in which each parameter value is modified using a Gaussian random process. After a fixed number of iterations or after a number of iterations without improvements, the point (set of parameters) with the highest evaluation value is returned.

At the end of the parameter optimization process, the best parameter sets for all query lengths are saved in buckets to reduce the number of parameter sets to keep (e.g. one set for queries of length 1 word, one set for length 2 and 3 words, one set for length 4 to 8 words and one set for length greater than 8 words). This process allows identifying suitable parameter sets for the specific events recorded and for all possible query lengths, within a particular system 100 (FIG. 1). The length may be determined based on the number of words in the query (preferably after having been purged of unnecessary characters or certain words in the query), or based on any other suitable measure of elements in the query.

When a query is executed (at step 410), the following equation is used, in order to select the right set of parameters for the query length. The equation returns the index of the parameter set (pSet) based on the query length ($q_{size}$) and the number of parameter sets (nSets).

$$pSet(q_{size}, nSets) = \max\left(0, \min\left(nSets - 1, \text{floor}\left(\frac{\ln(q_{size})}{\ln(2)}\right)\right)\right) \quad (4)$$

At step 416, a combined ranking score is calculated for the search results associated to entries in the ranking model that match one or more of the subsequent query elements. Firstly, stored search results of the ranking are selected from each map of the ranking model. Then a score is calculated for each selected accessed search result.

There are four subsets of search results to include in the result list based on the learned models, namely:
(1) search results from the stemQueryMap (SQM) associated with the exact same stemmed query (the maximum number of search results is specified by the filter parameter $F_{SQM}$);
(2) search results from stemWordAllMap (SWAM) that have in their model the conjunction of all query words (stemmed words and without stop words);
(3) search results from stemWordMap (SWM) that have in their model the disjunction of all query words (stemmed words and without stop words); and
(4) search results from originalWordMap (OWM) that have in their model the disjunction of all original query words (not stemmed and without stop words).

When all potential search results are selected from a matching of their query model with the current query, a combined ranking score is calculated, for each search result, using the following equation:

$$\text{score}(d) = E_{SQM}C_{SQM}S_{SQM} + E_{SWAM}C_{SWAM}S_{SWAM} + E_{SWM}C_{SWM}S_{SWM} + E_{OWM}C_{OWM}S_{OWM} \quad (5)$$

where $S_x$ is the search result score in the map x; $C_x$ is the coefficient, in the parameter set selected (based on the previously identified index pSet), for the map x; and $E_x$ equals 1 if the search result d was selected in the map x, 0 otherwise.

In one embodiment, for each query element, the search result score is further weighted with the information gain score of the query element, thereby giving more weight to query elements that normally lead to documents selected by users.

The result list is then ranked according to the calculated scores and the highest scoring search results, are then returned to the Query Pipeline together with their scores within a pre-ranked list of accessed search results, step 418. The scores may act as ranking functions for ranking the selected accessed search results when combined with search results identified by the Search Index module 106.

In the query pipeline 104, ranking functions are added to the subsequent search query for these search results to inform the index server 106 to increase their ranking score. The subsequent search query with the new ranking functions is then sent to the search index 106. The search index 106 generates subsequent search results for the subsequent query according to known search methods and further includes the ranked list of previously accessed search results received from the Query Pipeline 104. The inclusion of the ranked list of accessed search results and their ranking with respect to the subsequent search results generated by the search index 106 are determined based on the ranking functions. A combined list of results that includes the subsequent search results and the ranked previously accessed search results are then sent back to the user interface module 102. This combined list may be presented, such as being outputted, for example on a display screen (or any other suitable output device).

Advantageously, the system provides an automatic ranking improvement process within complex search infrastructures which may include: heterogeneous information sources, different use cases, many user roles, evolving content, and/or the like. This self-improving system advantageously takes into consideration users interactions with the system to improve the search experience by helping users find useful information faster, reducing the necessity for users to over specify their query or to learn the exact vocabulary used within the database being queried. In order to accomplish this, the system uses data gathered by an event logging system that records the main actions accomplished by users in the user interface. The events are used to build a model linking queries to search results, which is then used at query time to influence the list of search results displayed to the user and their ranking.

Advantageously, embodiments of the system described herein optimize search result relevance, automatically, based on the user interactions. The system records user actions in the user interface 102 and uses this information to learn about the relationships between queries used by the users and the desired search results, i.e. search results producing positive outcomes as defined by the owner of the system. Moreover, by automatically injecting ranking functions into a subsequent query, based on the learned ranking model, the system can continuously learn from the users' interactions and improve the search experience.

Although the preferred embodiment as illustrated in the accompanying drawings comprises components such as a query pipeline, an events database, an events analyser, etc. and although the associated method include steps as explained and illustrated herein, not all of these components, configurations and steps are essential to the invention and thus should not be taken in their restrictive sense, i.e. should not be taken as to limit the scope of the present invention. It is to be understood, as also apparent to a person skilled in the art, that other suitable components and cooperations thereinbetween, as well as other suitable configurations, organizations and/or architectures may be used for the ranking system and method as described herein and as can be easily inferred herefrom, by a person skilled in the art, without departing from the scope of the invention. Moreover, the order of the steps provided herein should not be taken as to limit the scope of the invention, as the sequence of the steps may vary in a number of ways, without affecting the scope or working of the invention, as can also be understood.

The above-described embodiments are considered in all respect only as illustrative and not restrictive, and the present application is intended to cover any adaptations or variations thereof, as apparent to a person skilled in the art. Of course, numerous other modifications could be made to the above-described embodiments without departing from the scope of the invention, as apparent to a person skilled in the art.

The invention claimed is:

1. A method for ranking search results, the method comprising:
    tracking a plurality of search sessions, each search session comprising one or more search queries made to a search index and one or more accessed search results, each search query defining at least one query element and generating a plurality of search results, and each accessed search result corresponding to one of the generated search results which is accessed by a user during the search session;
    for each accessed search result occurring across the plurality of search sessions, associating the accessed search result with each search query executed within a given search session prior to the user accessing the accessed search result;
    calculating for a preselection of query elements to be indexed, a result score for each pairing of a query element from the preselection and an associated accessed search result;
    detecting for each query element a query frequency score representing the number of times the query element appears in a search query associated to an accessed search result;
    selecting as said preselection, the query elements having a query frequency score exceeding a predetermined threshold; and
    generating a ranking model containing the result score in association with the corresponding pairing, for ranking subsequent search results from subsequent search queries according to the result scores.

2. The method according to claim 1, wherein the result score for each pairing is adjusted based on a relevance factor.

3. The method according to claim 2, wherein said relevance factor is selected from at least one of:
    an upgrade multiplier associated to a positive outcome during a search session;
    a downgrade multiplier associated to a negative outcome during a search session;
    a time decay multiplier corresponding to a time relevance of a given pairing of said query element and accessed search result; and
    information gain multiplier representing how useful a given query element is for achieving a desired search result.

4. The method according to claim 1, wherein the result score for each pairing is further determined based on the query frequency score of the query element of the pairing.

5. The method according to claim 1, wherein the preselection comprises a subset of said query elements and the result score for each pairing associated to the subset is determined based on the number of search queries associated to the accessed search result of the pairing and the average number of search queries associated to an accessed search result.

6. The method according to claim 5, further comprising, for a subsequent search query defining at least one subsequent query element;
 identifying at least one accessed search result stored in the ranking model based on a match between at least one subsequent query element and a matching query element in at least two mappings among the first mapping, the second mapping, the third mapping, and the fourth mapping;
 generating subsequent search results for the subsequent query from the search index; and
 presenting the at least one identified accessed search result in combination with the subsequent search results.

7. The method of claim 6, wherein the at least one identified accessed search result in combination with the subsequent search results are presented in a ranked list, and wherein the ranking of the at least one identified accessed search result within the ranked list is determined based in part on a combination of the result scores associated to said matching query elements.

8. The method according to claim 7, wherein identifying at least one accessed search result stored in the ranking model is further based on one or more of a match of a conjunction of query words of the subsequent search string with an entry in the first mapping, a match of a disjunction of query words of the subsequent search string with an entry in the second mapping, and a match of disjunction of original query words of the subsequent search string with an entry in the third mapping.

9. The method according to claim 8, further comprising:
 determining at least one parameter set of weighting coefficients based on machine learning applied to the plurality of search sessions for prioritizing last accessed search results of the plurality of search sessions, each parameter set comprising coefficients $C_{SQM}$, $C_{SWM}$, $C_{SWAM}$, $C_{OWM}$ and filter component $F_{SQM}$;
wherein the combination of the result scores is determined by:
 selecting a set of weighting coefficients to be applied based on at least one property of the subsequent query;
 selecting search results from each mapping of the ranking model;
 calculating a score, as a combined result score, according to:

score($d$)=$E_{SQM}C_{SQM}S_{SQM}$+$E_{SWAM}C_{SWAM}S_{SWAM}$+$E_{SWM}C_{SWM}S_{SWM}$+$E_{OWM}C_{OWM}S_{OWM}$ wherein $S_x$ is the search result score in the map x; $C_x$ is the coefficient, in the parameter set selected for the map x; and $E_x$ equals 1 if the search result d was selected in the map x, 0 otherwise.

10. The method of claim 9, wherein a plurality of said weighting coefficients are determined; and wherein the set of mapping-weight coefficients to be applied is determined based on a length of the subsequent query.

11. The method of claim 6, wherein identifying at least one accessed search result stored in the ranking model is performed prior to generating subsequent search results for the subsequent query from the search index.

12. The method according to claim 1, wherein the preselection of query elements comprises:

i) a first set of all tokenized and stemmed queries from the search queries executed across the plurality of search sessions,
ii) a second set of the most frequent tokenized original queries, and
iii) a third set of the most frequent tokenized and stemmed queries; and
wherein generating the ranking model comprises:
 i') generating a first mapping (SWAM) of result scores for pairings of an accessed search result and an associated tokenized and stemmed query of the first set;
 ii') generating a second mapping (OWM) of result scores for pairings of an accessed search result and an associated tokenized original query of the second set; and
 iii') generating a third mapping (SWM) of result scores for pairings of an accessed search result and an associated tokenized and stemmed query of the third set.

13. The method according to claim 12, wherein the preselection further comprises:
 iv) a fourth set of the most frequent stemmed queries; and
wherein generating the ranking model further comprises:
 iv') generating a fourth mapping (SQM) of result scores for pairings of an accessed search result and a stemmed query of the fourth set.

14. The method according to claim 13, wherein the result score for each pairing of the fourth mapping is the query frequency score of the stemmed query of the pairing and wherein the result score of each pairing of the first, second and third mappings is determined based on the query frequency score of the query element, the number of search queries associated to the accessed search result of the pairing and the average number of search queries associated to an accessed search result.

15. The method according to claim 14, wherein the result score of each pairing of the first, second and third mappings is determined:
 by calculating inverse search result frequency (IDF) according to:

$$IDF(q) = \ln\left(\frac{nd_t - nd_q + 0.5}{nd_q + 0.5}\right)$$

where $nd_t$ is the total number of clicked search results and $nd_q$ is the number of search results clicked for the query; and
 by calculating a score DocScore according to:

$$docScore(d, q) = \left(\frac{nd_q * (K+1)}{nd_q + K * \left(1 - B + B * \left(\frac{nq_d}{anq_d}\right)\right)}\right) * IDF(q)$$

where $nd_q$ is the number of clicked search results for a query, K is a constant, B is a constant, $nq_d$ is the number of queries that led to an accessed search result and $anq_d$ is the average number of queries for an accessed search result.

16. The method according to claim 1, further comprising, for a subsequent search query defining at least one subsequent query element:
 identifying at least one accessed search result stored in the ranking model based on a match of at least one subsequent query element with a query element stored in the ranking model;
 generating subsequent search results for the subsequent query from the search index; and presenting the at least one identified accessed search result in combination with the subsequent search results.

17. A method for ranking search results, the method comprising:
tracking a plurality of search sessions, each search session comprising one or more search queries made to a search index and one or more accessed search results, each search query defining at least one query element and generating a plurality of search results, and each accessed search result corresponding to one of the generated search results which is accessed by a user during the search session;
for each accessed search result occurring across the plurality of search sessions, associating the accessed search result with each search query executed within a given search session prior to the user accessing the accessed search result;
calculating for a preselection of query elements to be indexed, a result score for each pairing of a query element from the preselection and an associated accessed search result; and
generating a ranking model containing the result score in association with the corresponding pairing, for ranking subsequent search results from subsequent search queries according to the result scores; and
the method further comprising, for a subsequent search query defining at least one subsequent query element:
identifying at least one accessed search result stored in the ranking model based on a match of at least one subsequent query element with a query element stored in the ranking model;
generating subsequent search results for the subsequent query from the search index; and
presenting the at least one identified accessed search result in combination with the subsequent search results.

18. The method according to claim 17, wherein the at least one identified accessed search result in combination with the subsequent search results are presented in a ranked list, and wherein the ranking of the at least one identified accessed search result within the ranked list is determined based in part on the result score of the accessed search result.

19. The method according to claim 17, wherein identifying at least one accessed search result stored in the ranking model is performed prior to generating subsequent search results for the subsequent query from the search index.

20. A system for ranking search results, the system comprising:
at least one data storage device; and
at least one processor operably coupled to the at least one storage device, the at least one processor being configured for:
tracking, via a User Interface Module, a plurality of search sessions, each search session comprising one or more search queries made to a search index and one or more accessed search results, each search query defining at least one query element and generating a plurality of search results, and each accessed search result corresponding to one of the generated search results which is accessed by a user during the search session;
associating, in an Events Database, each accessed search result occurring across the plurality of search sessions, with each search query executed within a given search session, prior to the user accessing the accessed search result;
calculating, in an Events Analyser, for a preselection of query elements to be indexed, a result score for each pairing of a query element from the preselection and an associated accessed search result, wherein the calculating comprises:
detecting for each query element a query frequency score representing the number of times the query element appears in a search query associated to an accessed search result; and
selecting as said preselection, the query elements having a query frequency score exceeding a predetermined threshold; and
storing, in a Query-to-Search-Result Model Database, a ranking model containing the result score in association with the corresponding pairing, for ranking subsequent search results from subsequent search queries according to the result scores.

21. The system according to claim 20, wherein the calculating in the Events Analyser comprises adjusting the result score for each pairing based on a relevance factor.

22. The system according to claim 21, wherein said relevance factor is selected from at least one of:
an upgrade multiplier associated to a positive outcome during a search session;
a downgrade multiplier associated to a negative outcome during a search session;
a time decay multiplier corresponding to a time relevance of a given pairing of said query element and accessed search result; and
information gain multiplier representing how useful a given query element is for achieving a desired search result.

23. The system according to claim 20, wherein the calculating in the Events Analyser comprises determining the result score for each pairing based on the query frequency score of the query element of the pairing.

24. The system according to claim 20, wherein the preselection comprises a subset of said query elements and the result score for each pairing associated to the subset determined based on the number of search queries associated to the accessed search result of the pairing and the average number of search queries associated to an accessed search result.

25. The system according to claim 24, wherein the tracking, via the User Interface Module, further comprises receiving subsequent search query defining at least one subsequent query element, wherein the processor is further configured for, via a Query Pipeline Module:
identifying, by means of a Top-Search-Results Service, at least one accessed search result from the ranking model stored in the Query-to-Search-Result Model Database, on the basis of a match between at least one subsequent query element and a matching query element in at least two among the first mapping, the second mapping, the third mapping, and the fourth mapping; and
generating subsequent search results for the subsequent query from the search index;
returning the at least one identified accessed search result in combination with the subsequent search results for presentation by the User Interface Module.

26. The system according to claim 25, wherein the identifying by means of the Top-Search-Results Service comprises ranking at least one identified accessed search result in combination with the subsequent search results in a ranked list, and wherein the ranking of the at least one identified accessed search result within the ranked list is determined based in part on a combination of the result scores associated to said matching query elements.

27. The system according to claim 26, wherein identifying at least one accessed search result stored in the ranking model is further based on one or more of a match of a conjunction of query words of the subsequent search string with an entry in the first mapping, a match of a disjunction of query words of the subsequent search string with an entry in the second mapping, and a match of disjunction of original query words of the subsequent search string with an entry in the third mapping.

28. The system according to claim 27, wherein the processor is further configured for, via a Parameter-Calculating Module:
    determining at least one parameter set of weighting coefficients based on machine learning applied to the plurality of search sessions for prioritizing last accessed search results of the plurality of search sessions, each parameter set comprising coefficients $C_{SQM}$, $C_{SWM}$, $C_{SWAM}$, $C_{OWM}$ and filter component $F_{SQM}$;
wherein the identifying, by the Top-Search-Results Service Module comprises determining the combination of the result scores by:
    selecting a set of weighting coefficients to be applied based on at least one property of the subsequent query;
    selecting search results from each mapping of the ranking model;
    calculating a score, as a combined result score, according to:

$$score(d)=E_{SQM}C_{SQM}S_{SQM}+E_{SWAM}C_{SWAM}S_{SWAM}+E_{SWM}C_{SWM}S_{SWM}+E_{OWM}C_{OWM}S_{OWM}$$

wherein $S_x$ is the search result score in the map x; $C_x$ is the coefficient, in the parameter set selected for the map x; and $E_x$ equals 1 if the search result d was selected in the map x, 0 otherwise.

29. The system of claim 28, wherein a plurality of said weighting coefficients are determined; and wherein the set of mapping-weight coefficients to be applied is determined based on a length of the subsequent query.

30. The system according to claim 25, wherein identifying at least one accessed search result stored in the ranking model is performed prior to generating subsequent search results for the subsequent query from the search index.

31. The system according to claim 20, wherein the pre-selection of query elements comprises:
    i) a first set of all tokenized and stemmed queries from the search queries executed across the plurality of search sessions,
    ii) a second set of the most frequent tokenized original queries, and
    iii) a third set of the most frequent tokenized and stemmed queries; and
wherein the ranking model is generated in the Query-to-Search-Result Model Database by:
    i') generating a first mapping (SWAM) of result scores for pairings of an accessed search result and an associated tokenized and stemmed query of the first set;
    ii') generating a second mapping (OWM) of result scores for pairings of an accessed search result and an associated tokenized original query of the second set; and
    iii') generating a third mapping (SWM) of result scores for pairings of an accessed search result and an associated tokenized and stemmed query of the third set.

32. The system according to claim 31, wherein the pre-selection further comprises:
    iv) a fourth set of the most frequent stemmed queries; and wherein the ranking model in the Query-to-Search-Result Model Database is further generated by:
    iv') generating a fourth mapping (SQM) of result scores for pairings of an accessed search result and a stemmed query of the fourth set.

33. The system according to claim 32, wherein the result score for each pairing of the fourth mapping is the query frequency score of the stemmed query of the pairing and wherein the result score of each pairing of the first, second and third mappings is determined based on the query frequency score of the query element, the number of search queries associated to the accessed search result of the pairing and the average number of search queries associated to an accessed search result.

34. The system according to claim 33, wherein the calculating in the Events Analyser further comprises determining the result score of each pairing of the first, second and third mappings by:
    calculating inverse search result frequency (IDF) according to:

$$IDF(q) = \ln\left(\frac{nd_t - nd_q + 0.5}{nd_q + 0.5}\right)$$

where $nd_t$ is the total number of clicked search results and $nd_q$ is the number of search results clicked for the query; and
    calculating a score DocScore according to:

$$docScore(d, q) = \left(\frac{nd_q * (K+1)}{nd_q + K * \left(1 - B + B * \left(\frac{nq_d}{anq_d}\right)\right)}\right) * IDF(q)$$

where $nd_q$ is the number of clicked search results for a query, K is a constant, B is a constant, $nq_d$ is the number of queries that led to an accessed search result and $anq_d$ is the average number of queries for an accessed search result.

35. The system according to claim 20, wherein the tracking in the User Interface Module comprises receiving a subsequent search query defining at least one subsequent query element, and
    the at least one processor is further configured for, via a Query Pipeline Module:
        identifying by means of a Top-Search-Results Service at least one accessed search result from the ranking model stored in the Query-to-Search-Result Model Database, on the basis of a match of at least one subsequent query element with a query element stored in the ranking model; and
        generating subsequent search results for the subsequent query from the search index;
        presenting the at least one identified accessed search result in combination with the subsequent search results.

36. A system for ranking search results, the system comprising:
    at least one data storage device; and
    at least one processor operably coupled to the at least one storage device, the at least one processor being configured for:
        tracking, via a User Interface Module, a plurality of search sessions, each search session comprising one or more search queries made to a search index and one or more accessed search results, each search query defining at least one query element and generating a plurality of search results, and each accessed search result corresponding to one of the generated search results which is accessed by a user during the search session;

associating, in an Events Database, each accessed search result occurring across the plurality of search sessions, with each search query executed within a given search session, prior to the user accessing the accessed search result;

calculating, in an Events Analyser, for a preselection of query elements to be indexed, a result score for each pairing of a query element from the preselection and an associated accessed search result; and storing, in a Query-to-Search-Result Model Database, a ranking model containing the result score in association with the corresponding pairing, for ranking subsequent search results from subsequent search queries according to the result scores; and wherein the tracking, via the User Interface Module, further comprises receiving a subsequent search query defining at least one subsequent query element, wherein the processor is further configured for, via, a Query Pipeline Module:

identifying, by means of a Top-Search-Results Service, at least one accessed search result from the ranking model stored in the Query-to-Search-Result Model Database, on the basis of a match of at least one subsequent query element with a query element stored in the ranking model; and generating subsequent search results for the subsequent query from the search index;

presenting the at least one identified accessed search result in combination with the subsequent search results.

37. The system according to claim 36, wherein the identifying by means of the Top-Search-Results Service comprises ranking the at least one identified accessed search result in combination with the subsequent search results in a ranked list, and wherein the ranking of the at least one identified accessed search result within the ranked list is determined based in part on the search result of the accessed search result.

38. The system according to claim 36, wherein identifying at least one accessed search result stored in the ranking model is performed prior to generating subsequent search results for the subsequent query from the search index.

* * * * *